Nov. 15, 1932.  H. A. CEDERSTROM  1,888,072

SPRAY BAR FOR ROAD SPRAYING VEHICLES

Filed Sept. 26, 1930

Inventor
Harold A. Cederstrom
By his Attorneys
Williamson & Williamson

Patented Nov. 15, 1932

1,888,072

UNITED STATES PATENT OFFICE

HAROLD A. CEDERSTROM, OF MINNEAPOLIS, MINNESOTA, ASSIGNOR, BY MESNE ASSIGNMENTS, TO THE ROSCO MANUFACTURING COMPANY, OF MINNEAPOLIS, MINNESOTA, A CORPORATION OF MINNESOTA

SPRAY BAR FOR ROAD SPRAYING VEHICLES

Application filed September 26, 1930. Serial No. 484,566.

This invention relates to road spraying vehicles and particularly to spray bars therefor.

At the present time, oil and other dust laying fluids are sprayed onto highways from what are known as spray bars carried by road spraying vehicles, which run over the highways. These vehicles usually carry a large tank containing the liquid to be sprayed and connection is made between the tank and the spray bar which usually extends transversely of the vehicle at the rear end thereof. In spraying a road it is often desirable to spray a path wider than the width of the spraying vehicle and it is also often desirable to spray a section of the road outwardly beyond the path that the vehicle must travel.

It is also often desirable to vary the height of the spray bar on these road spraying vehicles relative to the road and it is also often desirable to spray windrows, shoulders, humps and depressions in the road which cannot usually be sprayed satisfactorily with the ordinary type of horizontal spray bar that is used. It is also desirable, at times, to spray different sections of the road relative to the path that the spraying vehicle must travel.

It is the object of the present invention to provide a spray bar of novel and improved construction for use on road spraying vehicles which is equipped with extensions which may be quickly and readily swung outwardly beyond the sides of the vehicle for immediate operation and may be also swung upwardly inwardly from the sides of the vehicle to an inoperative position.

It is a further object to provide means for supporting these extensions in various angular operative positions relative to the vehicle to permit proper spraying of windrows, shoulders, humps and depressions in the road.

Another object of the present invention is to provide a spray bar which can be conveniently raised and lowered to vary the height of the bar relative to the road.

Yet another object of the invention is to provide a spray bar which may spray various sections of a road relative to the path of travel of the vehicle.

These and other objects and advantages of the present invention will more fully appear from the following description, made in connection with the accompanying drawing, wherein like reference characters refer to the same or similar parts throughout the various views and, in which, Fig. 1 is a view in side elevation illustrating a road spraying vehicle embodying the present invention and shown as a trailer connected to a lead vehicle;

Figure 1:
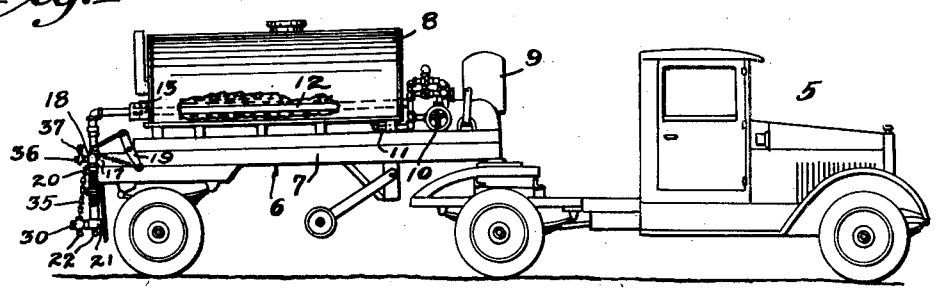

Referring to the drawing, there is illustrated a draft vehicle 5 and a trailer road spraying vehicle 6 operatively connected thereto. The trailer vehicle 6 has the usual rear wheels and pivoted front wheels and is provided with a frame 7 on which a large tank 8 is mounted. An engine, such as a gasoline engine 9, is also preferably carried on the frame 7 of the road spraying vehicle at the forward end thereof and this engine is operatively connected to a pump 10 which has various functions but may draw fluid from the tank 8 through a pipe 11 and discharge the fluid under pressure through a pipe 12. I preferably use the spraying and distributing means disclosed in my prior application for United States Patent, Serial Number 451,403, filed May 10, 1930, in connection with the pump 10 but this is not necessary. I prefer to locate an oil burner 13, supplied from a supply pipe 14, in my tank 8 to heat up the oil or other liquid to be sprayed, within the tank, prior to discharge therefrom, but this is not absolutely necessary, inasmuch as the oil may be charged into the tank in hot condition. In accordance with the present invention, I run the pipe 12 through the tank 8 to the rear end of the spraying vehicle in order that the oil or other liquid that is used may be maintained in heated condition without exposure to the atmosphere and consequent loss of heat during its travel from the pump 10 to the rear end of the vehicle. The pipe 12 is connected at its rear end to a T-fitting 15 secured to a divider pipe 16 extending transversely of the spraying vehicle at the rear end thereof, and secured to the frame 7 as by suitable brackets 17. The divider pipe 16 runs to points adjacent the outer sides of the vehicle but inwardly disposed therefrom and has, adjacent the sides of the vehicle, downwardly extending vertical portions 16a terminating in open ends. The two branch portions of the divider pipe 16 are individually controlled by valves 18, one of which is disposed at either side of the T-fitting 15. Each valve 18 is normally held closed but may be opened by suitable valve operating mechanism 19 which it is unnecessary to describe. A cross bar 20 shown as being formed from angle iron, is secured to the rear end of the frame 7 and has notches in its horizontal flange within which the upper ends of the vertical portions 16a of the divider pipe 16 fit.

A pair of angular pipes 21 are provided and these pipes have horizontal portions 21a perforated at spaced points to receive spray nozzles 22 and vertical portions 21b telescoping over the lower ends of the vertical portions 16a of the divider pipe 16. The extreme upper ends of the vertical portions 21b are enlarged somewhat to receive packing material 23 and the lower ends of jamb collars 24 which fit about the vertical portions 16a of divider pipes 16. The upper ends of the vertical portions 21b are provided with apertured flanges, while the jamb collars 24 have similar apertured flanges. Screws 25 having heads above the horizontal flange of bar 20, project through apertures therein and through the apertures of the flanges on collars 24 and through the apertures of the flanges on the upper ends of portions 21b and these screws carry nuts 26 below the flanges on portions 21b, above the flanges on the collars 24 and below the horizontal flange of the bar 20. With the construction thus described, it will be seen that the height of the pipes 21 may be vertically adjusted relative to the divider pipe 16 and to the ground. The nuts 26 at the upper ends of the screws 25 are at all times held in tightened position against the bottom of the horizontal flange of bar 20, while the pipes 21 may be raised or lowered relative to the divider pipe 16 by loosening or tightening the nuts 26 carried adjacent the lower ends of the screws 25. The position of the lower nuts 26 on the screws 25 will, of course, determine the height of the pipes 21 and when the pipes have been positioned as desired, the middle nuts 26 may be tightened against the jamb collars 24 to tighten the same against the packing 23 and form leak proof joints between the vertical portions 21b of pipes 21 and the vertical portions 16a of divider pipe 16. The horizontal portions 21a of the pipe 21 extend inwardly from adjacent the two sides of the vehicle and terminate at their inner ends in vertical flanges 21c which are bolted together, there being a disk 27 disposed between the two inner ends of the horizontal portions 21a and clamped between the flanges 21c so as to close the inner ends of these pipes. The two pipes 21, therefore, form a rigid assembly together and the horizontal portions 21a thereof form the main sections of the spray bar which extend between the sides of the vehicle.

Figure 3:
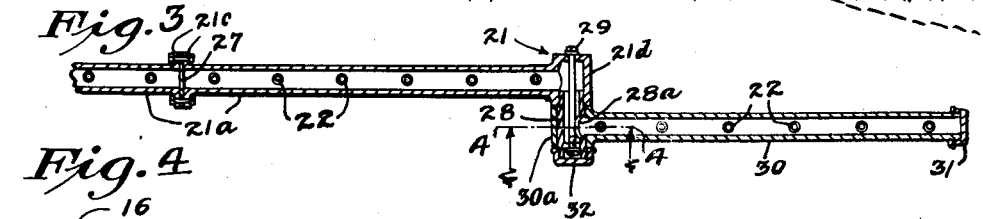
Fig. 3 is a horizontal section taken on the line 3—3 of Fig. 2, as indicated by the arrows
Figure 4:
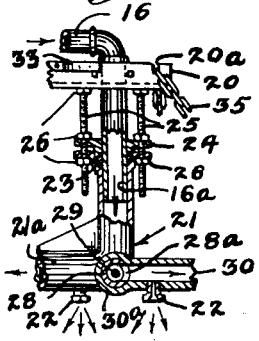
Fig. 4 is a vertical section taken on the line 4—4 of Fig. 3, as indicated by the arrows, certain of the parts being broken away and shown in section.

Each pipe 21 has a horizontal hub 21d open at its rear end and formed at the juncture of the horizontal portion 21a with the vertical portion 21b. Shrunk into the rear open end of each hub 21d so that it projects for a short distance into the hub, is a cylindrical shell or sleeve 28 closed at its outer end and being of slightly greater diameter beyond the hub 21 than within the hub so as to form a small shoulder which abuts the outer end of the hub. Each sleeve 28 is secured to its cooperating hub 21d by means of a nutted bolt 29 which projects through the axial center of the hub 21d and the sleeve 28 and has a head bearing against the forward end of the hub 21d and a nut bearing against the closed outer end of the sleeve 28 and fitting within a recess therein. Extension pipes 30 having spaced spray openings within which spray nozzles 22 are preferably secured, are closed at their outer ends by means of caps 31 and these pipes at their inner ends are provided with cylindrical hubs 30a which fit about the sleeves 28 and are journaled thereon. Caps 32 are threaded on the outer ends of the sleeves 28 and these caps serve to hold the hubs 30a of extension pipes 30 in place on the sleeves. The sleeves 28 have circular openings 28a therethrough adapted to be alined with the openings in the extension pipes 30 when the extension pipes are horizontally disposed in outwardly extending relation from the sides of the vehicle as shown in full lines Fig. 2, and in Figs. 3 and 4. When the extension pipes 30 are tilted upwardly or downwardly somewhat relative to the horizontal pipes as shown in the two lower dotted line positions illustrated in Fig. 2, communication is still possible through the openings 28a to the extension pipes 30. When the extension pipes 30, however, are swung upwardly and inwardly from the outer sides of the vehicle, as one of the extension pipes is shown in the upper right hand dotted position Fig. 2, the openings in the pipes 30 are no longer in alinement with the openings 28a in the sleeves 28 and no communication between the pipes 21 and the pipes 30 is possible.

To retain the pipes 30 in the upward and inwardly swung position, spring clips 33 are secured to the horizontal flange of bar 20 and the pipes 30 may be received and held under spring tension within these clips. Apertured ears 34 are secured to the extension pipes 30 adjacent their outer ends and chains 35 are attached at their outer ends to these ears. The vertical flange of the angle bar 20 is provided with notches 20a adjacent its two ends to receive the links of the chains 35 to hold the extension bars 30 at any desired tilted position relative to the horizontal. The pipes 30 will, of course, form the extensions of the spray bar.

Figure 2:
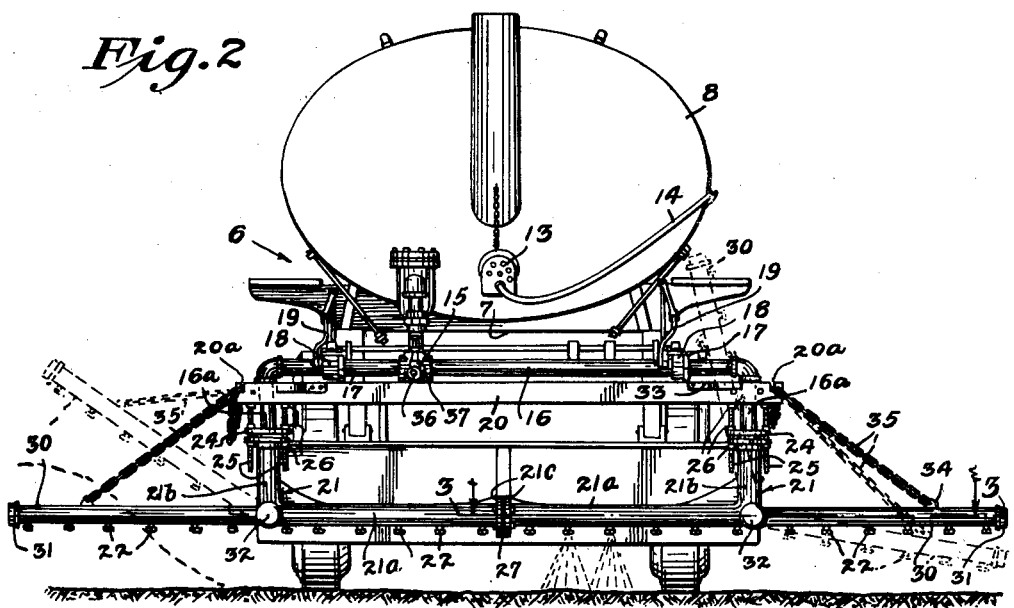
Fig. 2 is a view in rear elevation of the road spraying vehicle shown in Fig. 1, certain of the parts being shown in full lines in certain positions and in dotted lines in other positions.

As the road spraying vehicle is drawn over a road, it will be seen that the extension pipes 30 may be horizontally positioned to project outwardly beyond the sides of the vehicle as shown in full lines Fig. 2, whereupon as the valves 18 are opened, not only the road immediately below the vehicle may be sprayed but also the road at either side of the vehicle may be sprayed. If desired, either or both of the valves 18 may be opened so that liquid may be sprayed from only one of the pipes 21 and its extension pipe 30 or liquid may be sprayed from both pipes 21 and their extensions 30. The extension pipes 30 may be set at any desired angle relative to the horizontal portions 21a of the pipes 21 so that windrows, shoulders, humps and depressions may be properly sprayed by these extension pipes. The chains 35 engaged in the notches 20a of bar 20 will retain the extension pipes 30 so that they may be held at practically any desired inclination. If it is desired to move one of the extension pipes 30, to such a position that it will not project beyond the adjacent side of the vehicle, the extension pipe may be merely raised upwardly to the upper dotted line position as shown on the right side of Fig. 2 and engaged in the spring clip 32, whereupon no oil or other spraying liquid can flow to the extension pipe. The extension pipe in this position will be within the sides of the vehicle and other vehicles can readily pass the spraying vehicle on the highway without danger of being struck by the extension spray pipe 30. Also when one of the extension pipes 30 is raised to the upwardly swung position, the horizontal portion 21a of the pipe 21 to which the extension pipe 30 is joined can be used for spraying but a small section of the road. With the main spray pipes 21 and the two extension pipes 30 working in conjunction with the divider pipes 16 and the two valves 18, it will be seen that either one, two, three or four sections of the spray bar may be used for spraying purposes and, accordingly, the spray can be directed onto a very narrow portion of a road, two succeedingly wider portions of the road or a very wide portion thereof to meet different conditions. As the upwardly extending portions 21b telescope on the vertical portions 16a of the divider pipe 16, it will be seen that any desired vertical adjustment of the spray bar can be made relative to the road.

The T-fitting 15 preferably has a nozzle 36 running rearwardly therefrom and controlled by a valve 37, and it is possible to apply a hose to this nozzle for use in conducting liquid to portions of the road that cannot be covered by the spray bar.

It will be seen that a spray bar of simple construction has been provided which will operate with extreme efficiency for the purposes intended. The spray bar has been amply demonstrated in actual practice.

It will, of course, be understood that various changes may be made in the form, details, arrangement and proportions of the various parts without departing from the scope of the present invention.

What is claimed is:—

1. A spray bar for road spraying vehicles, comprising a conduit mounted on the vehicle adjacent one side thereof, but inwardly from the said side, said conduit being connected to a source of liquid supply, a horizontal pipe in full and direct communication with the discharge end of said conduit, communicating therewith at its own outer end and extending inwardly toward the center of the vehicle, an extension pipe having one end pivotally supported at the discharge end of said conduit for extension laterally beyond the said side of the vehicle and for swinging movement inwardly from the said side of the vehicle; and means affording full and direct communication between said conduit and said pivoted end of the extension pipe when said extension pipe is extended laterally beyond the said side of said vehicle and automatically closing off communication between said conduit and said extension pipe when said extension pipe is swung inwardly from said side of the vehicle, both said horizontal pipe and said extension pipe having spray openings therein, which may discharge fluid under substantially uniform pressure as a result of the arrangement defined.

2. A spray bar assembly for road spraying vehicles, comprising a supply conduit having branches leading downwardly to points adjacent the two sides of the vehicle, means for supplying liquid to said supply conduit, a valve in each branch of said supply conduit, horizontal pipes connected to and communicating at their outer ends with the lower portions of said branches and extending inwardly towards the longitudinal center of the vehicle, said horizontal pipes being closed at their inner ends, extension pipes pivoted to the lower ends of said branches for extension laterally beyond the sides of the vehicle and for extension upwardly inwardly from the side of the vehicle and means affording communication respectively between said branches and extension pipes when said extension pipes are extended laterally beyond the sides of the vehicle and closing off communication between said branches and said extension pipes when said extension pipes are upwardly extended inwardly from the sides of the vehicle, said horizontal pipes and said extension pipes having spray openings therein.

3. A spray bar for road spraying vehicles, comprising a conduit mounted on the vehicle and connected to a source of liquid supply and terminating in a vertical portion, a pipe having a vertical portion telescoping over the vertical portion of said conduit and having a horizontal portion extending from the lower end of said vertical portion thereof, a packing collar fitting about the vertical portion of said conduit, packing material interposed between said packing collar and the upper end of the vertical portion of said pipe, a pair of screws secured to said vehicle and running through ears on said collar and on the upper end of the vertical portion of said pipe and jamb nuts mounted on said screws above said first mentioned ears and below said last mentioned ears, whereby said pipe can be vertically adjusted on said vehicle to vary the spacing between the horizontal portion of the pipe and the road, the horizontal portion of said pipe having spray openings therein.

4. A spray bar for road spraying vehicles, comprising a supply conduit mounted on the vehicle and connected to a source of liquid supply and having branches terminating in vertical portions running downwardly adjacent the two sides of the vehicle, a pair of angular pipes having vertical portions telescoping over the vertical portions of said branches and having horizontal portions running inwardly from their vertical portions, said horizontal portions having closed inner ends secured together, the horizontal portions of said pipes having spray openings therein, a support mounted on said vehicle above the upper ends of the vertical portions of said pipes, screws running downwardly from said support, flanges carried by the upper ends of the vertical portions of said pipes, said screws running through said flanges, jamb nuts carried by said screws and bearing against the lower sides of the said flanges and packing glands between the vertical portions of said vertical branches and the upper ends of the vertical portions of said pipes, whereby the spacing between the horizontal portions of said pipes, and the ground can be varied.

5. In a spray bar apparatus for road spraying vehicles, a pair of vertically disposed fluid conduits designed to discharge downwardly at opposed sides of a vehicle; a pair of horizontal spray pipes rigidly joined together at their inner ends substantially centrally of the vehicle, and projecting laterally into rigid union at their outer ends with the lower ends of said vertical conduits; at least one extension spray bar pivotally mounted for support by and communication with the lower end of the corresponding vertical conduit, and designed to extend laterally beyond the vehicle; and means for securing said vertical conduits to the vehicle, whereby they and said rigid unions may comprise the sole support for said horizontal and extension spray bars.

6. In a spray bar apparatus for road spraying vehicles, a horizontal spray bar for arrangement transversely of the vehicle, with its ends disposed substantially within the lateral confines of the vehicle; a conduit for supplying fluid to said horizontal spray bar; and an extension spray bar having a valved pivotal connection with one end of said horizontal spray bar, so that it may be swung to extend laterally well beyond the vehicle; said pivotal connection comprising a pair of axially aligned hollow hubs on the respective joined ends of the said spray bars, and a ported sleeve fitted partially within each hub and designed to establish fluid communication between said spray bars.

In testimony whereof I affix my signature.

HAROLD A. CEDERSTROM.